United States Patent
Lee et al.

(10) Patent No.: US 6,290,843 B1
(45) Date of Patent: Sep. 18, 2001

(54) OIL SUMP WITH INTEGRAL FILTER

(76) Inventors: Brian Thomas Lee, 4015 Canterbrook Dr., Charlotte, NC (US) 28269; Edward Allen Covington, 4153 Graceway Dr., Gastonia, NC (US) 28052

(*) Notice: Subject to any disclaimer, the term of this patent is extended or adjusted under 35 U.S.C. 154(b) by 0 days.

(21) Appl. No.: 09/588,302

(22) Filed: Jun. 7, 2000

(51) Int. Cl.$^7$ .................... B01D 29/07; B01D 35/027; F01M 11/06
(52) U.S. Cl. .................... 210/168; 210/172; 210/460; 210/474; 210/493.3; 210/493.5; 184/6.24
(58) Field of Search .................... 210/172, 416.5, 210/168, 493.5, 493.3, 460, 474; 184/6.24

(56) References Cited

U.S. PATENT DOCUMENTS

| 4,352,737 | * 10/1982 | Taniguchi . | |
| 5,853,577 | 12/1998 | Gizowski et al. | 210/168 |
| 5,863,424 | * 1/1999 | Lee . | |
| 6,013,179 | * 1/2000 | Laughlin et al. . | |
| 6,143,169 | * 11/2000 | Lee . | |

FOREIGN PATENT DOCUMENTS 08-021303(A) * 1/1996 (JP) .

* cited by examiner

Primary Examiner—Thomas M. Lithgow
(74) Attorney, Agent, or Firm—Millen, White, Zelano & Branigan, P.C.

(57) ABSTRACT

An oil sump with an integral filter includes an upper sump having a major opening therethrough which contains the integral filter and a minor opening through which projects a tube which is connected to the inlet of a suction pump. Beneath the upper sump is a lower sump into which the tube projects and with which the opening with the filter is in communication. Both the upper sump and lower sump are made of a plastic material, such as a thermoplastic or thermosetting material, which includes enforcing fibers. A lower sump is fixed to the upper sump by either a strong permanent adhesive or by welding, using known welding processes such as ultrasonic welding, vibration welding or friction welding.

9 Claims, 2 Drawing Sheets

OIL SUMP WITH INTEGRAL FILTER

FIELD OF THE INVENTION

The present invention relates to oil sumps with integral filters and more particularly, the present invention relates to a transmission oil sump with an integral filter.

BACKGROUND OF THE INVENTION

A typical transmission oil sump is configured as a stamped steel pan bolted to the transmission case with a separate gasket between the pan and transmission case. Typically, a separate filter element is situated in the sump and connected to the inlet of a suction pump to filter oil as the oil is drawn from the sump and recirculated back through the transmission. By having separate components, the current arrangement requires assembly steps at the transmission factory, which separate assembly steps provide an opportunity for assembly errors, increased labor costs, and expense. In addition, stamped steel pans in and of themselves are relatively expensive. Moreover, the steel is expensive to recycle. An additional consideration is weight savings because by saving weight, fuel consumption and the resulting pollution is reduced. Over the years, enormous weight savings are accomplished by the cumulative effect of reducing weight in numerous small components wherein the weight reduction is sometimes in the form of ounces rather than pounds.

An approach is to make transmission oil sumps from plastic. Again, weight considerations are important. Accordingly, where components would not be robust because they are shielded from impacts by other components, they may be of lightweight construction. If components are of lightweight construction, then there need to be associated structures, also lightweight, which negate any problems which may occur due to lightweight construction. Therefore, savings in weight also may make desirable structural configurations which permit weight savings.

SUMMARY OF THE INVENTION

In view of the aforementioned considerations, the present invention is directed to an arrangement for filtering recirculating transmission oil, comprising an upper sump and a lower sump wherein both the upper and lower sumps are concave and have floors. The floor of the upper sump has a major opening therethrough which receives a filter element that filters transmission oil pooled in the upper sump as that oil flows through the major opening to the lower sump. The return pump inlet communicates with the lower sump and is adapted to connect to the inlet of a suction pump for recirculating transmission oil to the transmission in which the filtering arrangement is used.

In a further aspect of the invention, the return pump inlet is a tubular member which extends through a minor opening in the floor of the upper sump into the lower sump.

In still a further aspect of the invention, the lower and upper sumps are made of a lightweight material such as a plastic material.

In an additional aspect of the invention, the lower and upper sumps are made of plastic and are welded or otherwise bonded to one another.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts through the several views, and wherein.

DETAILED DESCRIPTION

Figure 1:
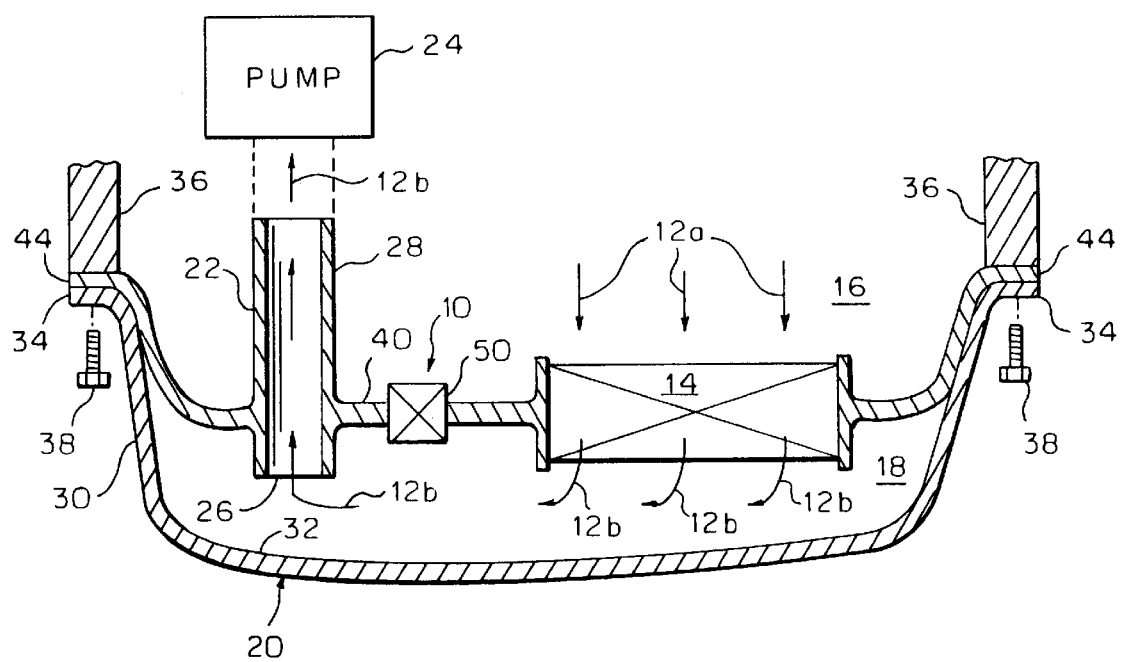
FIG. 1 is a side elevation of a transmission oil sump with a prior art transmission oil filter arrangement.

Referring now to FIG. 1, there is shown a transmission oil sump 10 configured in accordance with the principles of the prior art, wherein a steel pan 12 is attached to a transmission case 14. Transmission oil 16 pools in the steel sump pan 12 and is pulled through inlet 18 of a filter element 20 by suction pump inlet 22 for recirculation back through the associated transmission (not shown). As is apparent from FIG. 1, it is necessary to assemble the filter element 20 and steel sump pan 12 at the transmission assembly site. Moreover, the filter element 20 and steel pan 12 tend to be relatively heavy.

Figure 2:
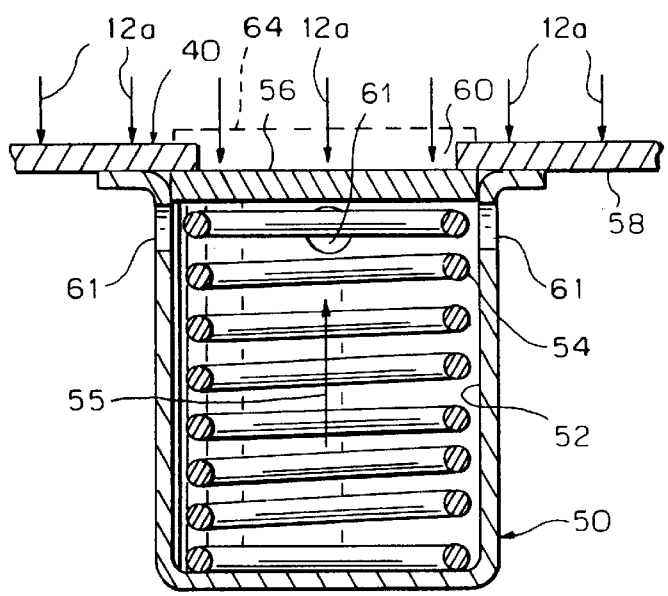
FIG. 2 is a side elevation of a first embodiment of a transmission oil sump with a filter arrangement in accordance with the present invention.
Figure 3:
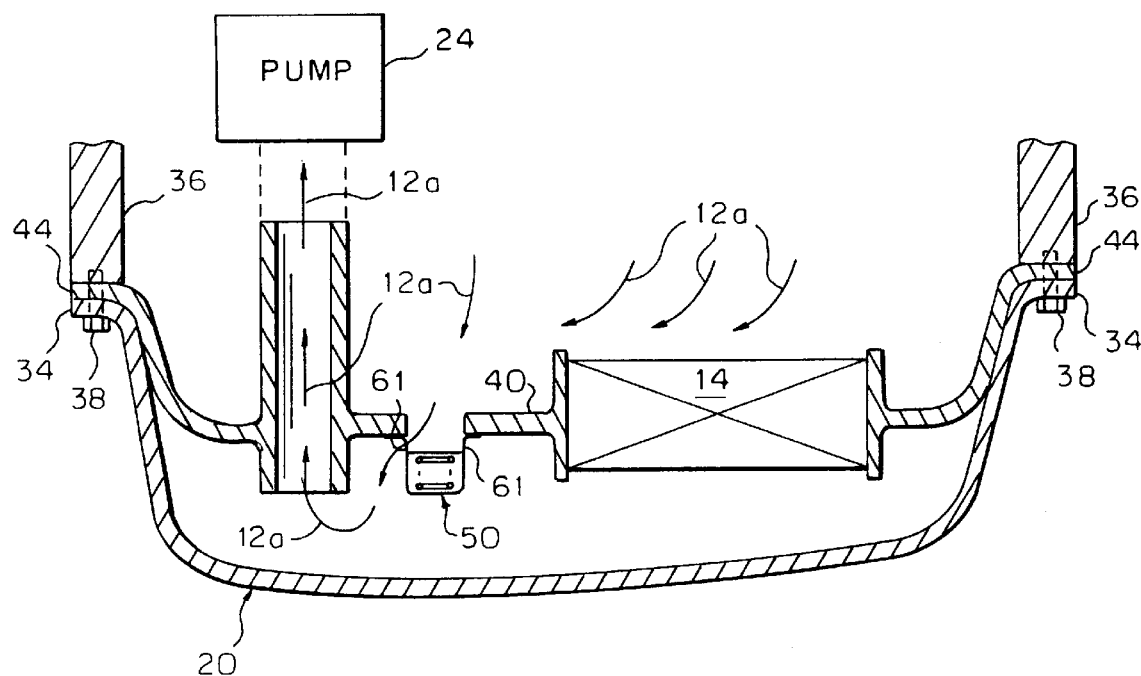
FIG. 3 is an enlarged side elevation of a partition of the transmission oil sump of FIG. 2.
Figure 4:
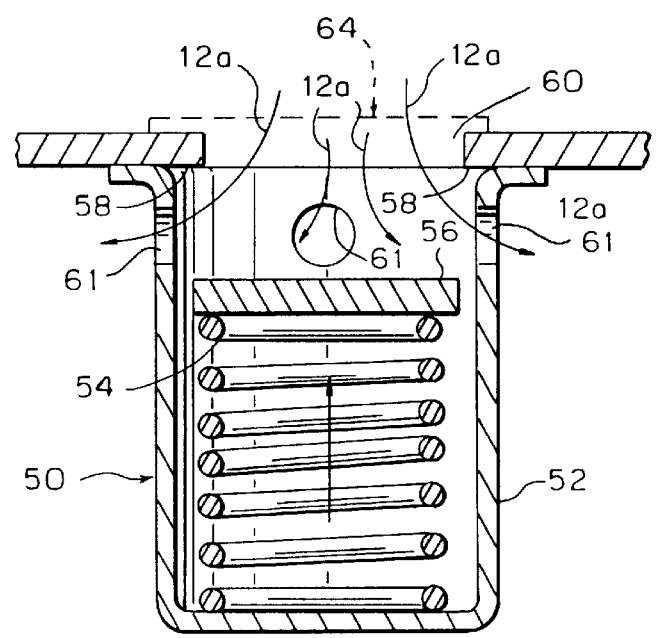
FIG. 4 is a top view of the transmission oil sump and filter arrangement according to FIG. 2.
Figure 3:
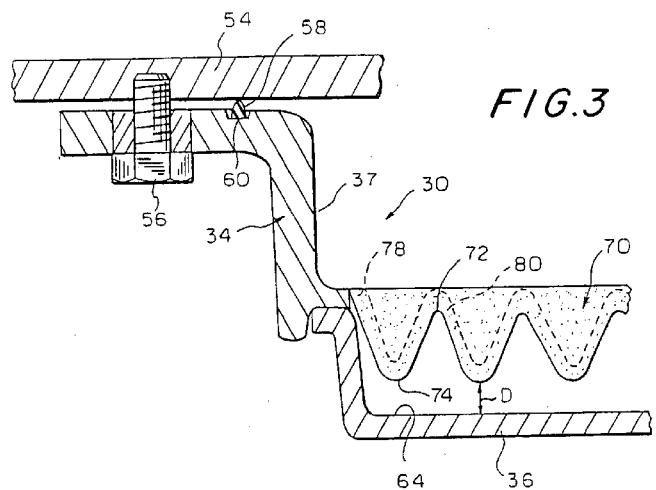
Figure 4:
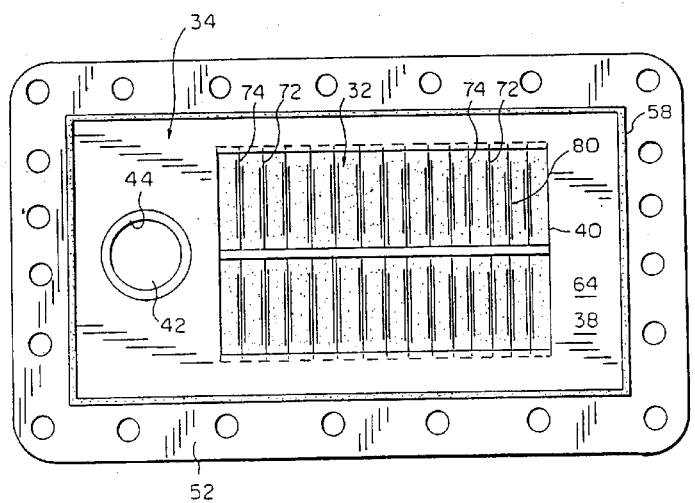

Referring now to FIGS. 2–4, wherein an oil sump 30 with an integral filter 32, configured in accordance with the principles of the present invention, is shown. As is seen in FIG. 2, the transmission oil sump 30 is comprised of an upper sump 34 and a lower sump 36. The upper sump 34 has a floor 38 with a major opening 40 therethrough in which is positioned the filter element 32. The floor 38 further has a minor opening 42 therethrough which is formed by a tube 44 having a lower end 46 within the lower sump 36 and an upper end 48 which is adapted to be connected to a suction pump inlet 50. The suction pump inlet 50 is connected to a suction pump (not shown) so as to withdraw transmission oil from the lower sump 36 and to recirculate that oil through the associated automatic transmission (not shown).

The upper sump has an outwardly extending mounting flange 52 which extends around the perimeter thereof and is fixed to the housing 54 of the transmission by a plurality of bolts 56. Inboard of the bolts 56 is a gasket 58 which is seated within a slot 60 in the flange 52 between the bolts 56 and the concave portion 37 of the upper sump 34.

The lower sump 36 has a floor 64 which is spaced a distance D from the bottom of the filter element 32. The lower sump 36 further includes a peripheral wall 66 having a laterally projecting flange 68. The laterally projecting flange 68 seats against the bottom surface 69 of the floor 38 and is surrounded by a peripheral lip 70 which projects downwardly from the floor of the upper sump 34. The lower sump 36 is fixed to the bottom surface of the floor 38 of the upper sump 34 by utilizing an adhesive material, by friction welding, ultrasonic welding, vibration welding, or any other permanent bonding process in which the lower sump 36 remains fixed to the upper sump 34. An example of friction welding occurs in U.S. Pat. No. 5,853,577 issued Dec. 29, 1998 and incorporated herein in its entirety by reference. Additional possible approaches are to snap the sumps 34 and 36 together at the floor 38 of the upper sump, or to bolt the lower sump to the upper sump, in each case with a gasket therebetween.

As is seen in FIG. 4, the filter element 32 preferably comprises a frame portion 70 which is unitary with the floor 38 of the upper sump 34. The frame portion 70 is comprised of a pair of side panels which have peaks and valleys 72 and 74 respectively formed in side panels. The side panels 76 have edge portions 78 of a filter media 80 inserted therein in order to support the filter media. Preferably, the filter media 80 is a pleated paper filter media, but may also be comprised of other materials or fabrics such as, for example but not limited to, polyester fiber.

The preferable material for the upper pan 34 and the lower pan 36 is preferably a composite material such as a polyamide material, or a thermoplastic or thermosetting material which may include reinforcement such as fiberglass strands.

The aforedescribed sump 30 with an integral filter accomplishes cost savings because multiple components are combined into one. Moreover, it is lighter in weight than the prior art of FIG. 1.

From the foregoing description, one skilled in the art can easily ascertain the essential characteristics of this invention and, without departing from the spirit and scope thereof, can make various changes and modifications of the invention to adapt it to various usages and conditions.

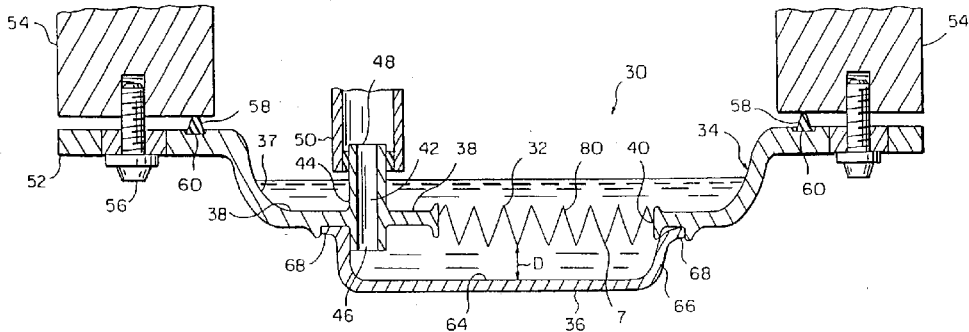

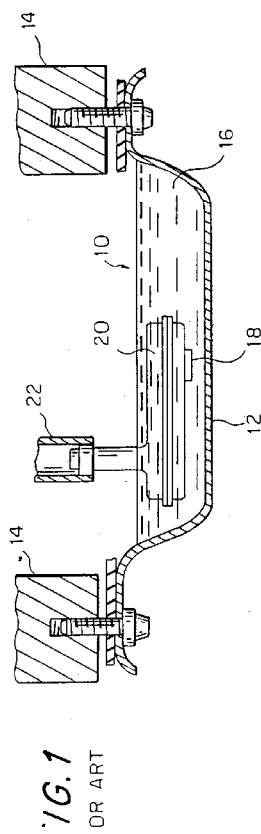
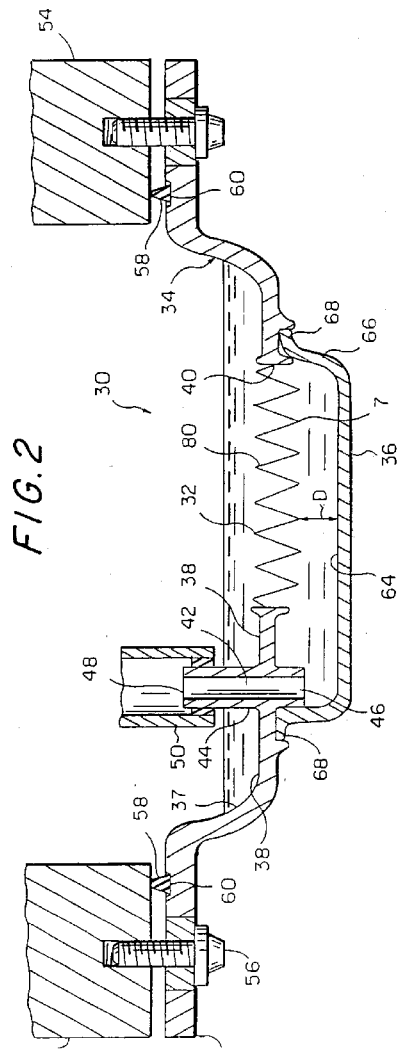

We claim:

1. An arrangement for filtering recirculating transmission oil, comprising:
    an upper sump made of plastic material and having a concave portion with a first floor having a major opening therethrough, a side wall and peripheral attaching arrangement extending laterally from the side wall and adapted to mount the upper sump to a transmission;
    a lower sump made of plastic material and attached only to the first floor of the upper sump, the lower sump being concave and having a second floor underlying the major opening through the upper sump;
    a filter element disposed in the major opening for filtering transmission oil pooled in the upper sump as the transmission oil flows through the opening to the lower sump; and
    a return pump inlet communicating with the lower sump and adapted to connect to the inlet of a suction pump for recirculating transmission oil to a transmission after the transmission oil has been filtered by the filter element.

2. The arrangement of claim 1 wherein there is a minor opening through the floor of the upper sump and wherein the return pump inlet is a tubular member which extends through the minor opening in the floor of the upper sump and into the lower sump.

3. The arrangement of claim 2, wherein the filter element has a pleated filter media, the pleated filter media being disposed in a relatively rigid frame.

4. The arrangement of claim 1, wherein the lower sump has a peripheral flange that is fixed permanently to the lower side of the first floor.

5. The arrangement of claim 4, wherein the flange of the lower sump is bonded to the lower side of the first floor by an adhesive or by welding.

6. The arrangement of claim 4, wherein the lower sump is mechanically joined to the upper sump by being bolted or snapped thereon, a seal therebetween being provided by a gasket therebetween.

7. The arrangement of claim 1, wherein the plastic material is a polyamide material.

8. The arrangement of claim 1, wherein the plastic material is a plastic composite comprising reinforcing strands embedded in thermoplastic or thermosetting resin.

9. The arrangement of claim 1, wherein the peripheral attachment comprises a laterally extending flange having a gasket thereon and mounting holes therethrough adapted to receive bolts to retain the upper sump on a transmission housing.

* * * * *

UNITED STATES PATENT AND TRADEMARK OFFICE
CERTIFICATE OF CORRECTION

PATENT NO.    : 6,290,843 B1
DATED         : September 18, 2001
INVENTOR(S)   : Brian Thomas Lee et al.

It is certified that error appears in the above-identified patent and that said Letters Patent is hereby corrected as shown below:

The title page should be deleted to appear as per attached title page.

The sheets of drawings consisting of figures 1-4 should be deleted to appear as per attached Figures 1-4.

Signed and Sealed this

Seventh Day of October, 2003

JAMES E. ROGAN
*Director of the United States Patent and Trademark Office*

United States Patent
Lee et al.

(10) Patent No.: US 6,290,843 B1
(45) Date of Patent: Sep. 18, 2001

(54) OIL SUMP WITH INTEGRAL FILTER

(76) Inventors: Brian Thomas Lee, 4015 Canterbrook Dr., Charlotte, NC (US) 28269; Edward Allen Covington, 4153 Graceway Dr., Gastonia, NC (US) 28052

(*) Notice: Subject to any disclaimer, the term of this patent is extended or adjusted under 35 U.S.C. 154(b) by 0 days.

(21) Appl. No.: 09/588,302

(22) Filed: Jun. 7, 2000

(51) Int. Cl.⁷ .................. B01D 29/07; B01D 35/027; F01M 11/06
(52) U.S. Cl. ............... 210/168; 210/172; 210/460; 210/474; 210/493.3; 210/493.5; 184/6.24
(58) Field of Search ................. 210/172, 416.5, 210/168, 493.5, 493.3, 460, 474; 184/6.24

(56) References Cited

U.S. PATENT DOCUMENTS

| | | |
|---|---|---|
| 4,352,737 * | 10/1982 | Taniguchi . |
| 5,853,577 | 12/1998 | Gizowski et al. ............... 210/168 |
| 5,863,424 * | 1/1999 | Lee . |
| 6,013,179 * | 1/2000 | Laughlin et al. . |
| 6,143,169 * | 11/2000 | Lee . |

FOREIGN PATENT DOCUMENTS 08-021303(A) * 1/1996 (JP) .

* cited by examiner

Primary Examiner—Thomas M. Lithgow
(74) Attorney, Agent, or Firm—Millen, White, Zelano & Branigan, P.C.

(57) ABSTRACT

An oil sump with an integral filter includes an upper sump having a major opening therethrough which contains the integral filter and a minor opening through which projects a tube which is connected to the inlet of a suction pump. Beneath the upper sump is a lower sump into which the tube projects and with which the opening with the filter is in communication. Both the upper sump and lower sump are made of a plastic material, such as a thermoplastic or thermosetting material, which includes enforcing fibers. A lower sump is fixed to the upper sump by either a strong permanent adhesive or by welding, using known welding processes such as ultrasonic welding, vibration welding or friction welding.

9 Claims, 2 Drawing Sheets